(12) United States Patent
Minamida

(10) Patent No.: US 6,256,513 B1
(45) Date of Patent: Jul. 3, 2001

(54) MULTIMEDIA TERMINAL DEVICE

(75) Inventor: Noriaki Minamida, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/118,013

(22) Filed: Jul. 17, 1998

Related U.S. Application Data

(63) Continuation-in-part of application No. PCT/JP98/00010, filed on Jan. 6, 1998.

(30) Foreign Application Priority Data

Jan. 7, 1997 (JP) .................................................. 9-011955

(51) Int. Cl.$^7$ .................................................. H04M 1/00
(52) U.S. Cl. .......................................... 455/557; 455/556
(58) Field of Search ................................ 455/556, 557, 455/558; 379/93.08, 93.09, 93.11; 375/222

(56) References Cited

U.S. PATENT DOCUMENTS

| | | | |
|---|---|---|---|
| 5,797,102 | * | 8/1998 | Hallikainen et al. ................. 455/557 |
| 5,802,471 | * | 9/1998 | Sawai et al. .......................... 455/445 |

FOREIGN PATENT DOCUMENTS

| | | |
|---|---|---|
| 0466590 | 1/1992 | (EP) . |
| 750439 | 12/1996 | (EP) . |
| 5-504036 | 6/1993 | (JP) . |
| 5-183654 | 7/1993 | (JP) . |
| 5-268381 | 10/1993 | (JP) . |
| 5-324511 | 12/1993 | (JP) . |
| 6-14130 | 1/1994 | (JP) . |
| 6-44157 | 2/1994 | (JP) . |
| 6-274454 | 9/1994 | (JP) . |
| 7-87224 | 3/1995 | (JP) . |
| 8-18694 | 1/1996 | (JP) . |
| 8-5278 | 1/1996 | (JP) . |
| 8-214085 | 8/1996 | (JP) . |
| 92/01347 | 1/1992 | (WO) . |

OTHER PUBLICATIONS

Copy of an English Language Abstract of JP No. 5–183654.
Copy of an English Language Abstract of JP No. 6–44157.
Copy of an English Language Abstract of JP No. 7–87224.
Copy of an English Language Abstract of JP. No. 6–274454.
Copy of an English Language Abstract of JP No. 8–18694.
Copy of an English Language Abstract of JP No. 5–268381.
Copy of an English Language Abstract of JP No. 6–14130.
Copy of an English Language Abstract of JP No. 5–324511.
Copy of an English Language Abstract of JP No. 8–5278.
Copy of an English Language Abstract of JP No. 8–214085.

* cited by examiner

*Primary Examiner*—Lee Nguyen
(74) *Attorney, Agent, or Firm*—Greenblum & Bernstein, P.L.C.

(57) ABSTRACT

In a multimedia radio communication system in which a plurality of types of information media are combined, more than two terminals are connected to one terminal interface adapter connected to a mobile station apparatus. In this way, more than two sorts of information are multiplexed and communicated by radio between one mobile station and a base station.

28 Claims, 15 Drawing Sheets

FIG. 4

| | 1 | 2 | | | |
|---|---|---|---|---|---|
| CONNECTION NUMBER | 1 | 2 | — | — | 3 |
| COMMUNICATION CONDITION | ○ | ○ | × | × | ○ |
| SERVISE TYPE | FAX | FACSIMILE VOICE | ISDN | FAX | FACSIMILE DATA |
| TERMINAL ID | #0 | #1 | #2 | #3 | #4 |

411 — CONNECTION NUMBER
412 — COMMUNICATION CONDITION
413 — SERVISE TYPE
414 — TERMINAL ID

FIG. 13

TERMINAL CONTROL TABLE TYPE

| TYPE | ADDRESS | CONNECTION |
|---|---|---|
| A | 1 | ○ |
| B | 2 | ○ |
| C | 3 | × |
| D | 4 | × |
| E | 5 | ○ |
| F | 6 | ○ |

FIG. 14

CALL NUMBER ADDRESS CONTROL TABLE

| CALL NUMBER | ADDRESS |
|---|---|
| 1 | --------------- |
| 2 | --------------- |
| 3 | --------------- |
|  | --------------- |

MULTIMEDIA TERMINAL DEVICE

CROSS-REFERENCE TO RELATED APPLICATIONS

This is a Continuation-In-Part of International Application PCT/JP98/00010, with an international filing date of Jan. 6, 1998, which was not published in English, which designated the United States, and which claims priority under 35 U.S.C. 119 of Japanese Application No. 9-11955, filed Jan. 7, 1997, the disclosures of which are incorporated by reference in their entirety.

BACKGROUND OF THE INVENTION

1. Field of the Invention

The present invention relates to a multimedia terminal device for communicating by radio with a base station by multimedia.

2. Description of the Related Art

Recently a multimedia radio communication system in which a plurality of information media are combined has been wide spread.

As a terminal for connecting to the multimedia radio communication system, a voice terminal, a facsimile terminal, an ISDN terminal, a data terminal and so on are known. Further a voice composite terminal for switching a line in using is also known.

Examples of a conventional multimedia radio communication system are disclosed in Japanese unexamined patent publication No. 5-183654 and Japanese unexamined patent publication No. 6-44157.

FIG. 1 illustrates a schematic diagram of a conventional multimedia radio communication system.

As illustrated in FIG. 1, a conventional multimedia radio communication system is composed of various terminals (described as "mobile station side terminal" in the following) 101, mobile station apparatus 102 connected to each mobile station side terminal 101 separately and base station apparatus 103 for communicating by radio with mobile station apparatus 102.

Base station apparatus 103 is connected to network 104 using cables, and network 104 is connected to various terminals (described as "network terminal" in the following) 105.

In the case where a mobile station side terminal 101 of facsimile terminal initiates a data communication request to network terminal 105, mobile station side terminal 101 first provides a connection request to base station apparatus 103 via mobile station apparatus 102.

And in the case where it is confirmed that network terminal 105 is available by base station apparatus 103 via network 104, base station apparatus 103 provides the service receipt information to mobile station side terminal 101 via mobile station apparatus 102.

Then a radio data communication is performed by a facsimile signal between mobile station side terminal 101 and network terminal 105.

Next, in the case where, while a radio data communication is performed by facsimile between network terminal 105 and mobile station side terminal 101, mobile station side terminal 111 differing from a facsimile terminal, for instance a voice terminal, initiates a data communication request to network terminal 115, mobile station side terminal 111 provides a connection request to base station apparatus 103 via mobile station apparatus 112.

In the case where it is confirmed that network terminal 115 is available by base station apparatus 103, base station apparatus 103 provides the service receipt information to mobile station side terminal 111 via mobile station apparatus 112.

Then a radio data communication is performed by voice signal between mobile station side terminal 111 and network terminal 115.

However in the conventional multimedia radio communication system described above, since each terminal is connected to a mobile station apparatus separately, in the case where data communications by different media are performed, it has the problem that a mobile station apparatus is necessary for each sort of data communications.

SUMMARY OF THE INVENTION

The present invention has an object to provide a multimedia radio communication system in which communications from more than two terminals can be performed with one mobile station apparatus for communicating by radio with a base station apparatus.

The object is achieved by connecting more than two terminals to one terminal interface adapter connected to a mobile station apparatus.

BRIEF DESCRIPTION OF THE DRAWINGS

FIG. 4 is a schematic diagram illustrating terminal information of each mobile station side terminal in a multimedia radio communication system in the embodiment of the present invention;

FIG. 13 is a configuration diagram of a terminal control table;

FIG. 14 is a configuration diagram of a call number address control table.

BEST MODE FOR CARRYING OUT THE INVENTION

The embodiment of the present invention is explained in detail with drawings in the following.

Figure 1:
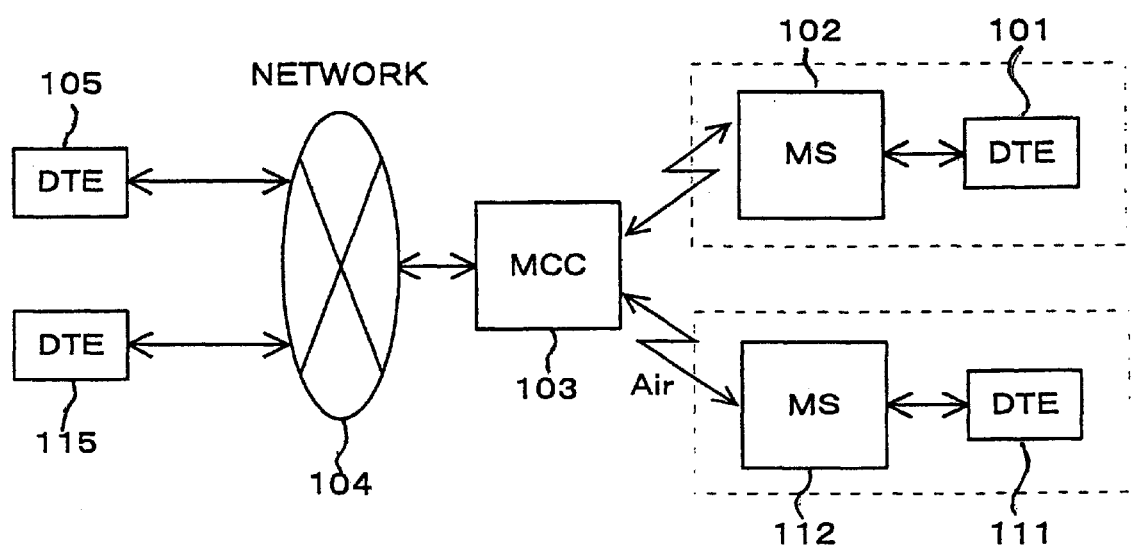
FIG. 1 is a block diagram illustrating a configuration of a conventional multimedia radio communication system.
Figure 2:
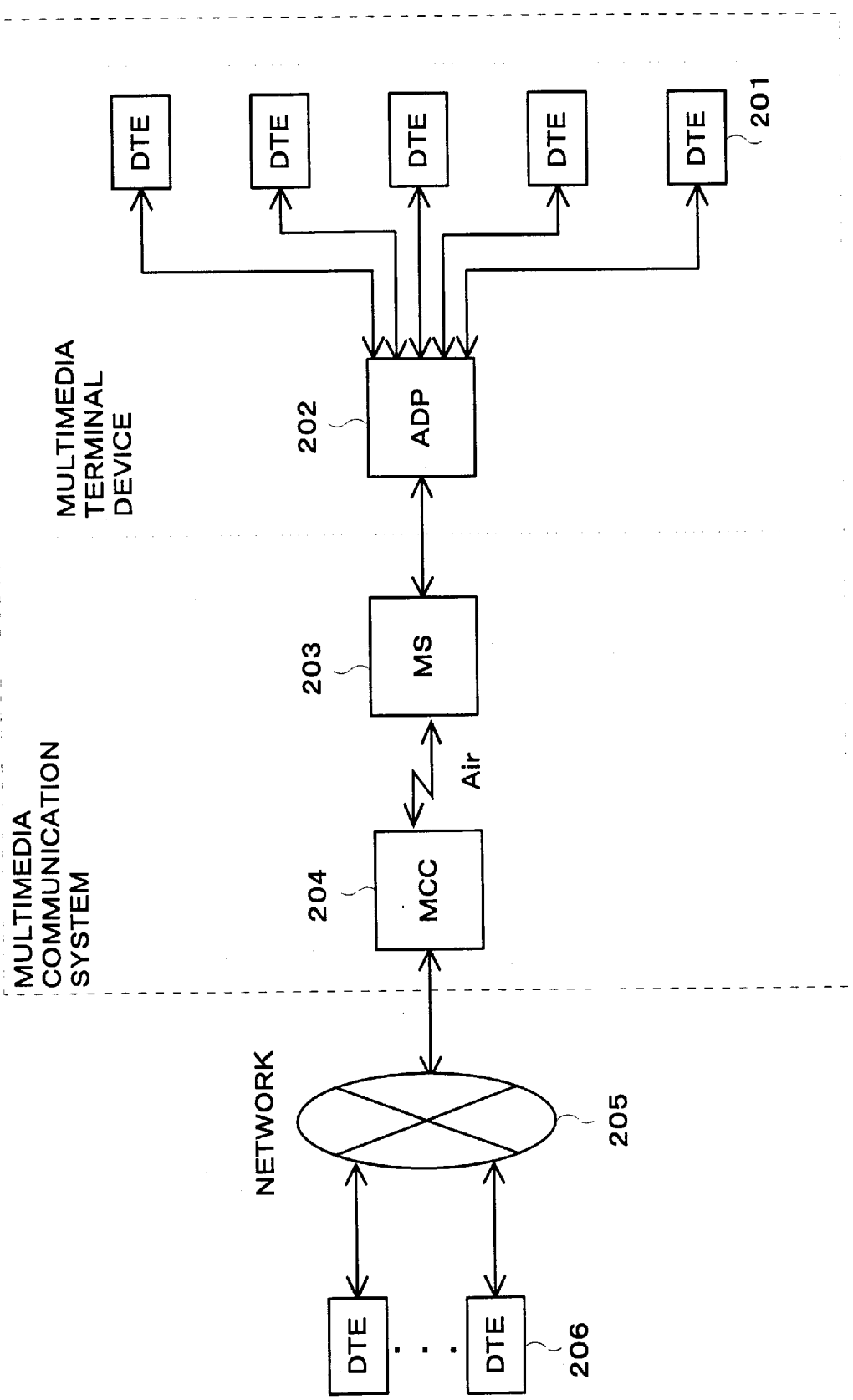
FIG. 2 is a block diagram illustrating a configuration of a multimedia radio communication system in the embodiment of the present invention.

FIG. 2 is a block diagram illustrating a configuration of a multimedia radio communication system in the embodiment of the present invention;

As illustrated in FIG. 2, a multimedia radio communication system in the embodiment of the present invention is composed of a plurality of various terminals 201 (described as "mobile side terminal" in the following), terminal interface adapter 202 (described as "ADP" in the following) connected to mobile side terminal 201 with a different interface, mobile station apparatus 203 and base station apparatus 204 for communicating by radio with mobile station apparatus 203.

Base station apparatus 204 is connected to network 205 using cables and network 205 is connected to various terminals 206 (described as "network terminal" in the following).

A time division multiple communication path is established between base station apparatus 204 and mobile station apparatus 203, and between mobile station apparatus 203 and ADP 202. A multiple position in a time division multiple communication path used for communication is assign as a physical address, then a line is determined.

Figure 3:
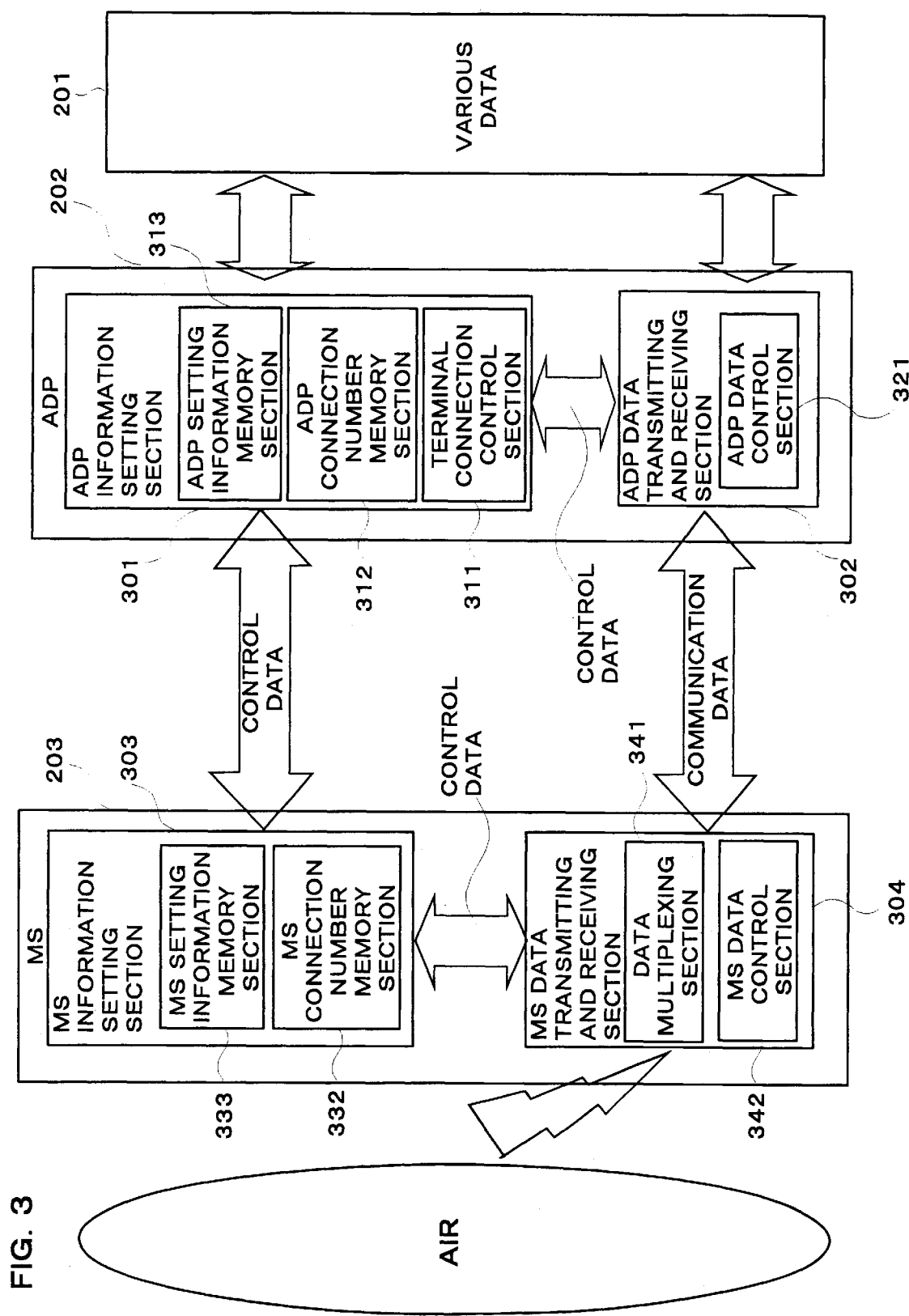
FIG. 3 is a block diagram of ADP and a mobile station apparatus in a multimedia radio communication system in the embodiment of the present invention.

Next the configurations of ADP 202 and mobile station apparatus 203 in a multimedia radio communication system in the embodiment of the present invention are concretely explained with a block diagram in FIG. 3.

As illustrated in FIG. 3, ADP 202 has ADP information setting section 301 for setting the information of mobile side terminal 201 connected to ADP 202 and ADP data transmitting and receiving section 302 for mediating communication data between mobile side terminal 201 and mobile station apparatus 203.

ADP information setting section 301 includes terminal connection control section 311 for deciding a type and the number of mobile side terminals 201 connected to ADP 202, ADP connection number memory section 312 for memorizing the number of mobile side terminals 201 connected to ADP 202 on the basis of the information from terminal connection control section 311, and ADP setting information memory section 313 for memorizing setting status of each mobile side terminal 201.

And ADP data transmitting and receiving section 302 includes ADP data control section 321 for controlling a transmission timing, reception timing and so on.

Mobile station apparatus 203 has MS information setting section 303 for grasping the setting status of ADP 202 and each mobile side terminal 201 by transmitting and receiving control data with ADP information setting section 301 and MS communication data transmitting and receiving section 304 for mediating communication data between ADP 202 and base station apparatus 204.

MS information setting section 303 includes MS connection number memory section 332 for memorizing the same data as that memorized at ADP connection number memory section 312 and MS setting information memory section 333 for memorizing the same data as that memorized at ADP setting information memory section 313.

And MS data transmitting and receiving section 304 includes data multiplexing section 341 for multiplexing data to be transmitted into base station apparatus 204 and MS data control section 342 for coding and decoding data.

At ADP setting information memory section 313, the terminal information of each mobile side terminal 201 connected to ADP 202 illustrated in the schematic diagram in FIG. 4 is memorized.

As illustrated in FIG. 4, the terminal information includes connection number 411 indicating the transmission order of multiplexed data, communication condition 412 indicating whether each mobile side terminal 201 is in service or not, service type 413 for mobile side terminal 201 and terminal ID 414 of each mobile side terminal 201.

At MS setting information memory 333, the same terminal information as that at ADP setting information memory section 313 is stored. When the contents of the terminal information at ADP setting information memory section 313 is renewed, the contents of the terminal information at MS setting information memory 333 is also renewed by linking.

Figure 5:
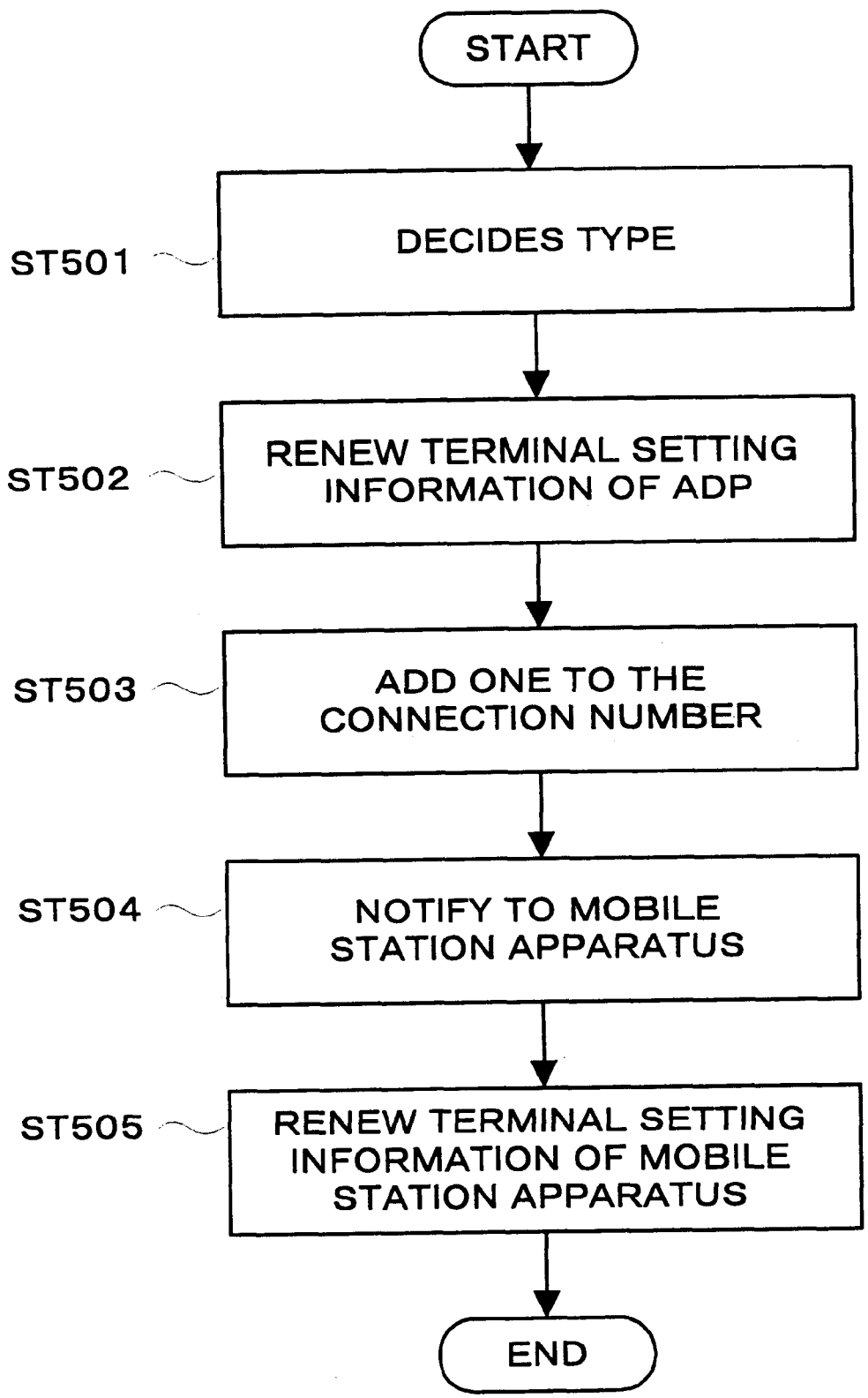
FIG. 5 is a flow chart illustrating a communication preparation operation in a multimedia radio communication system in the embodiment of the present invention.

Next the communication preparation operation in a multimedia radio communication system in the embodiment of the present invention is explained with a flow chart in FIG. 5.

In step 501 (described as "ST" in the following) up to ST 502, when a new mobile side terminal 201 is connected to ADP 202, terminal connection control section 311 at ADP information setting section 301 decides the type of connected terminal 201, then the terminal information memorized at ADP setting information memory section 313 is renewed.

Next in ST 503, it is added one that the terminal connection number stored at ADP connection number memory section 312 by using the information from terminal connection control section 311.

Next in ST 504, the renewed terminal information and the terminal connection number at ADP information setting section 301 are notified to MS information setting section 303 at mobile station apparatus 203.

In addition a notification of the terminal information is performed when mobile station apparatus 203 asks to notify or when turning on ADP 202, besides when a new mobile side terminal 201 is connected to ADP 202.

Next in ST 505, the terminal information memorized at MS information setting section 303 is renewed to be matched with the terminal information of ADP information setting section 301.

By the operations described above, MS information setting section 303 at mobile station apparatus 203 grasps the terminal type capable of responding to the service request from base station apparatus 204 and the total number of terminals connected to ADP 202 to multiplex the data.

In addition in the case of detaching mobile side terminal 201 connected to ADP 202, according to the same procedure that described above, the terminal information at ADP information setting section 301 and MS information setting section 303 is renewed, and it is subtracted one that the connection terminal numbers stored at ADP connection number memory section 312.

Figure 6:
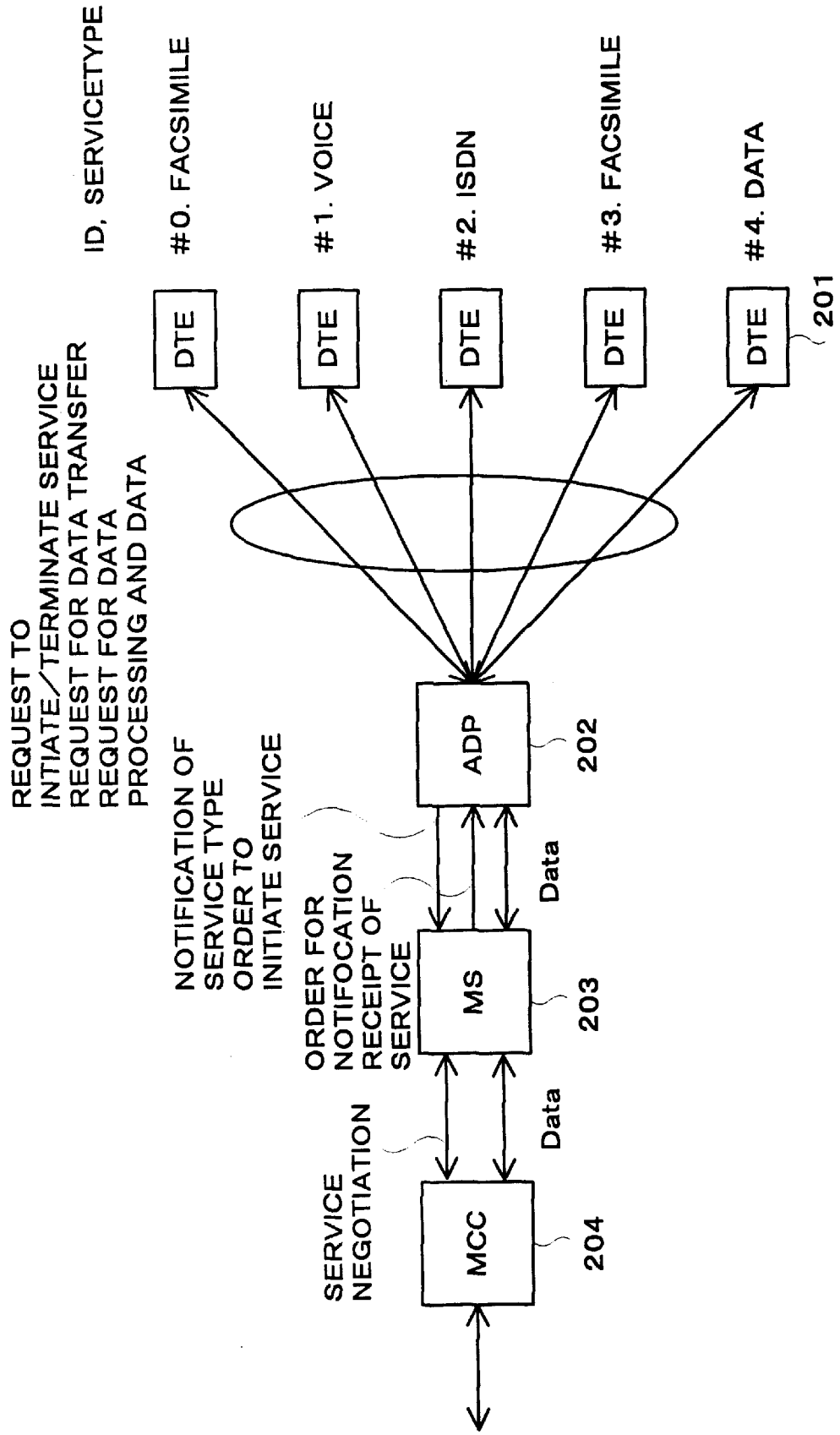
FIG. 6 is a concept diagram illustrating types of signals and data transmitted and received between each apparatus in a multimedia radio communication system in the embodiment of the present invention.

FIG. 6 is a concept diagram illustrating types of signals and data transmitted and received between each apparatus in a multimedia radio communication system in the embodiment of the present invention.

Each apparatus transmits and receives the communication data and control signals with another apparatus connected.

Control signals transmitted from various terminals 201 to ADP 202 include a service initiation request or termination request signal, a data transfer request signal and so on. And control signals transmitted from ADP 202 to various terminals 201 include a service initiation or termination request signal, a data processing request signal and so on.

Control signals transmitted from ADP 202 to mobile station apparatus 203 include a service initiation order signal, a service type notification signal and so on. And control signals transmitted from mobile station apparatus 203 to ADP 202 include a notification order signal, service receipt signal and so on.

A service negotiation signal is transmitted and received between mobile station apparatus 203 and base station apparatus 204.

By transmitting and receiving these control signals, the data communication path is established between mobile side terminal 201 and network terminal 206, that allows to perform the data communication.

The flow of a signal in a multimedia radio communication system in the embodiment of the present invention is explained with the flow chart illustrated in FIG. 7 in the following.

First in ST 701, a service initiation request signal is provided from mobile side terminal 201 to ADP 202, and a service initiation order signal is output from ADP 202 to mobile station apparatus 203 according to the type of mobile side terminal 201.

Next in ST 702, the negotiation whether the condition is matched or not is performed between mobile station apparatus 203 and base station apparatus 204 responding to the type of mobile side terminal 201.

When the condition is matched in ST 702, a service receipt signal is returned from mobile station apparatus 203 to mobile side terminal 201 via ADP 202 in ST 703.

At the same time in ST 704, communication condition 412 of the terminal information of the mobile side terminal 201 to initiate the service is renewed at base station apparatus 204, mobile station apparatus 203 and ADP 202.

And in ST 705, the data communication between mobile side terminal 201 and network terminal apparatus 206 is initiated.

Afterwards, when the termination signal is transmitted in ST 706 up to ST 707, the data communication is terminated. Then communication condition 412 of the terminal information of the mobile side terminal 201 to initiate the service is renewed at base station apparatus 204, mobile station apparatus 203 and ADP 202.

When the condition is not matched in ST 703, the data communication can not be initiated, and a communication impropriety signal is returned from mobile station apparatus 203 to mobile side terminal 201 via ADP 202 in ST 708.

Figure 7:
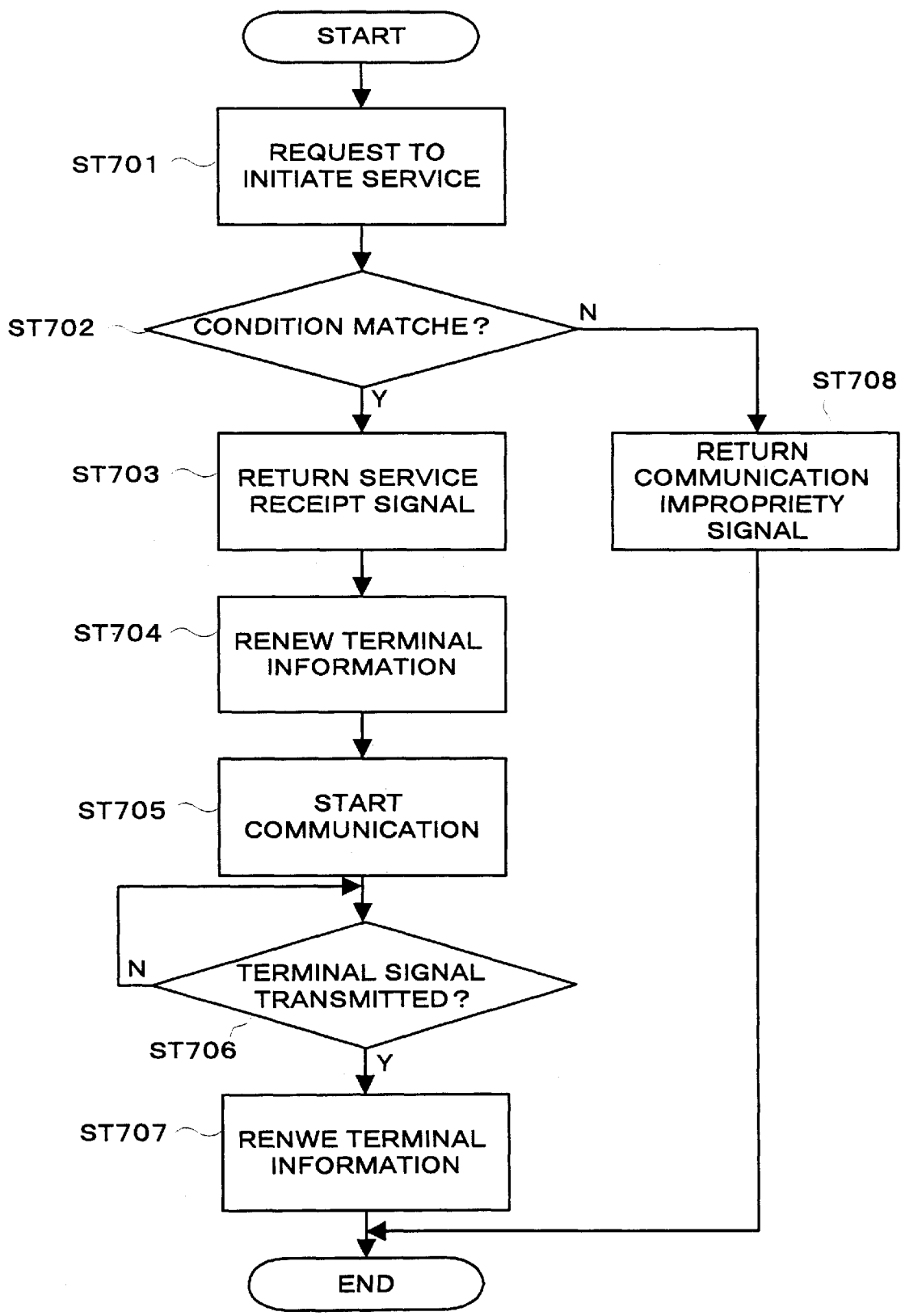
FIG. 7 is a flow chart illustrating a flow of a signal in a multimedia radio communication system in the embodiment of the present invention.

In the case where a service initiation request signal is transmitted to mobile station apparatus 203 from mobile side terminal 201 or network terminal 206 which is a different type from that in communicating, by repeating the procedure illustrated in FIG. 7, the multimedia communication service in which a plurality of communications are concurrently performed is achieved.

In this case, the data to be transmitted from mobile side terminal 201 is multiplexed at data multiplexing section 341 at mobile station apparatus 203 and transmitted by radio to base station apparatus 204.

In addition explained above is the case where a service request is provided from mobile side terminal 201 connected to ADP 202, the communication can be processed in the case where a service request is provided from network terminal 206 according to the same procedure.

Figure 8:
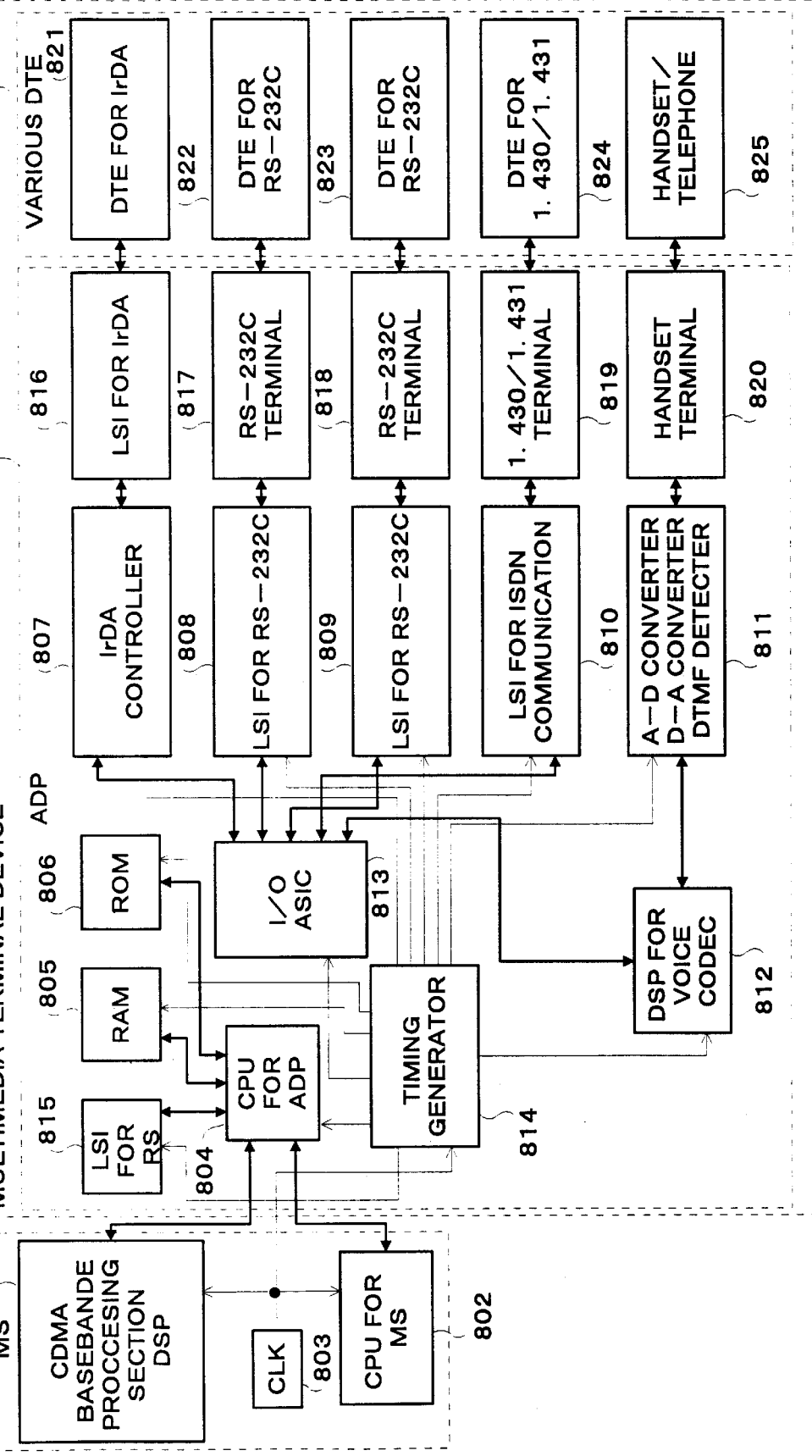
FIG. 8 is a block diagram illustrating an example of hardware configuration of a mobile station apparatus and ADP in a multimedia radio communication system in the embodiment of the present invention.
Figure 9:
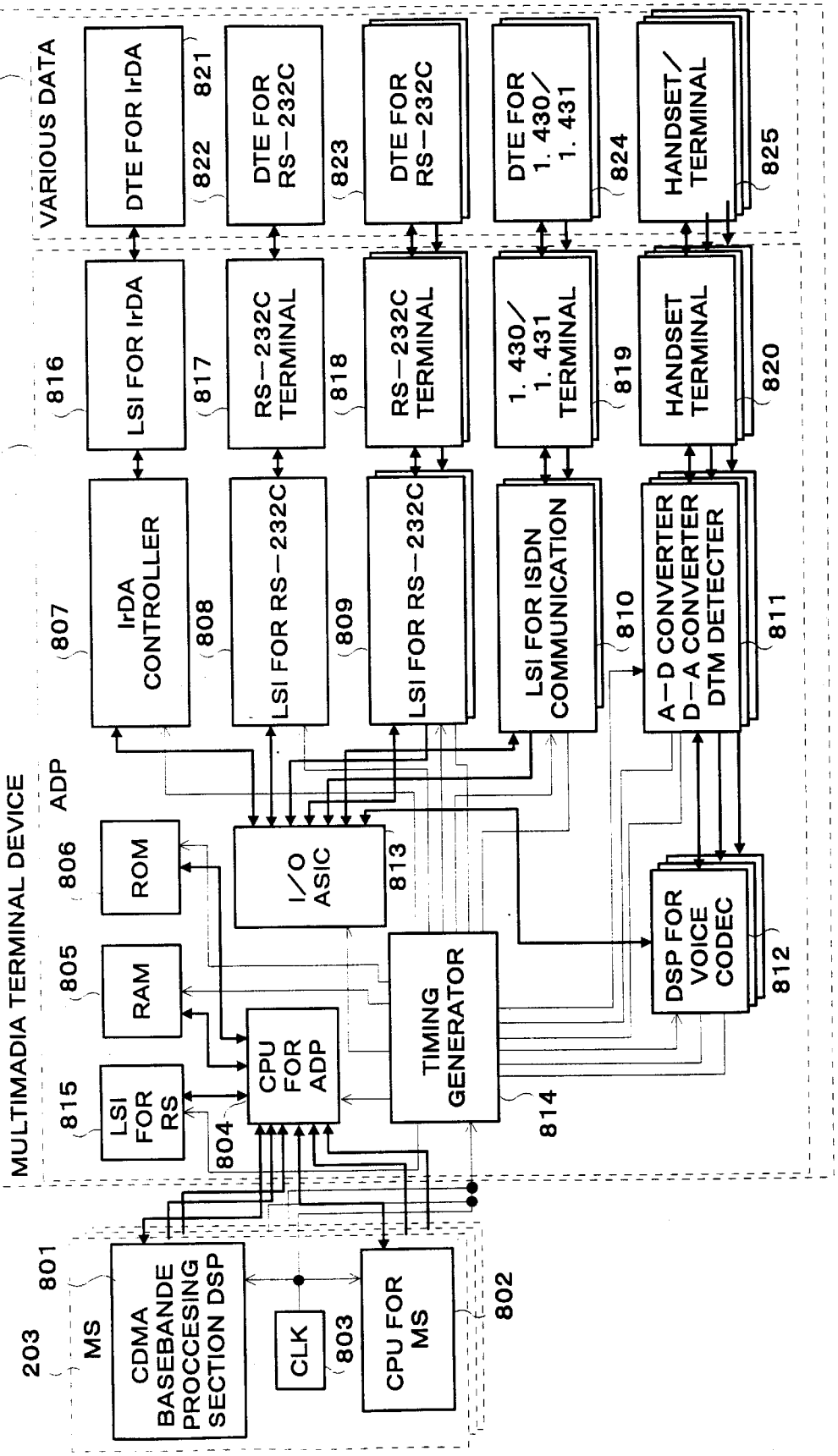
FIG. 9 is a block diagram illustrating an example of hardware configuration of a mobile station apparatus and ADP in a multimedia radio communication system in the embodiment of the present invention.

Next an example of hardware configuration of a mobile station 203 and ADP 202 in a multimedia radio communication system in the embodiment of the present invention is explained with block diagrams illustrated in FIG. 8 and FIG. 9.

FIG. 9 illustrates the case where a plurality of LSI for the terminal interface are installed to install a plurality of terminal interfaces at the configuration illustrated in FIG. 8.

As illustrated in FIG. 8 and FIG. 9, mobile station apparatus 203 includes DSP (digital signal processor) 801 generally for providing over baseband signal processing, CPU 802 generally for providing over control of mobile station apparatus 203 and CLK 803 for distributing each clock.

ADP 202 includes CPU 804 for ADP, memory sections including RAM 805, RAM 806 and so on, controller for IrDA 807 to control transmission and reception of signals between terminal 821 connected with infrared interface, LSI for IrDA 816, LSI for RS-232C 808 and 809 to control transmission and reception of signals respectively between terminals 822 and 823 connected with RS-232C interface, LSI for ISDN communication 810 to control transmission and reception of signals with terminal 824 connected with ISDN interface (I.430/I.431), and terminal 825 connected with handset interface.

And ADP 202 includes A-D converter/D-A converter/ DTMF detector 811 to control transmission and reception of signals, DSP 812 for voice CODEC corresponded to A-D converter/D-A converter/DTMF detector 811, I/O-ASIC 813 to uniformly control controller for IrDA 807, LSI for RS-232C 808 and 809, LSI for ISDN communication 810 and DSP 812 for voice CODEC as I/O control to CPU 804 for ADP, LSI for RS 815 to execute error check and timing generator 814 to generate each timing by receiving a clock from CLK 803 at mobile station apparatus 203.

Figure 10:
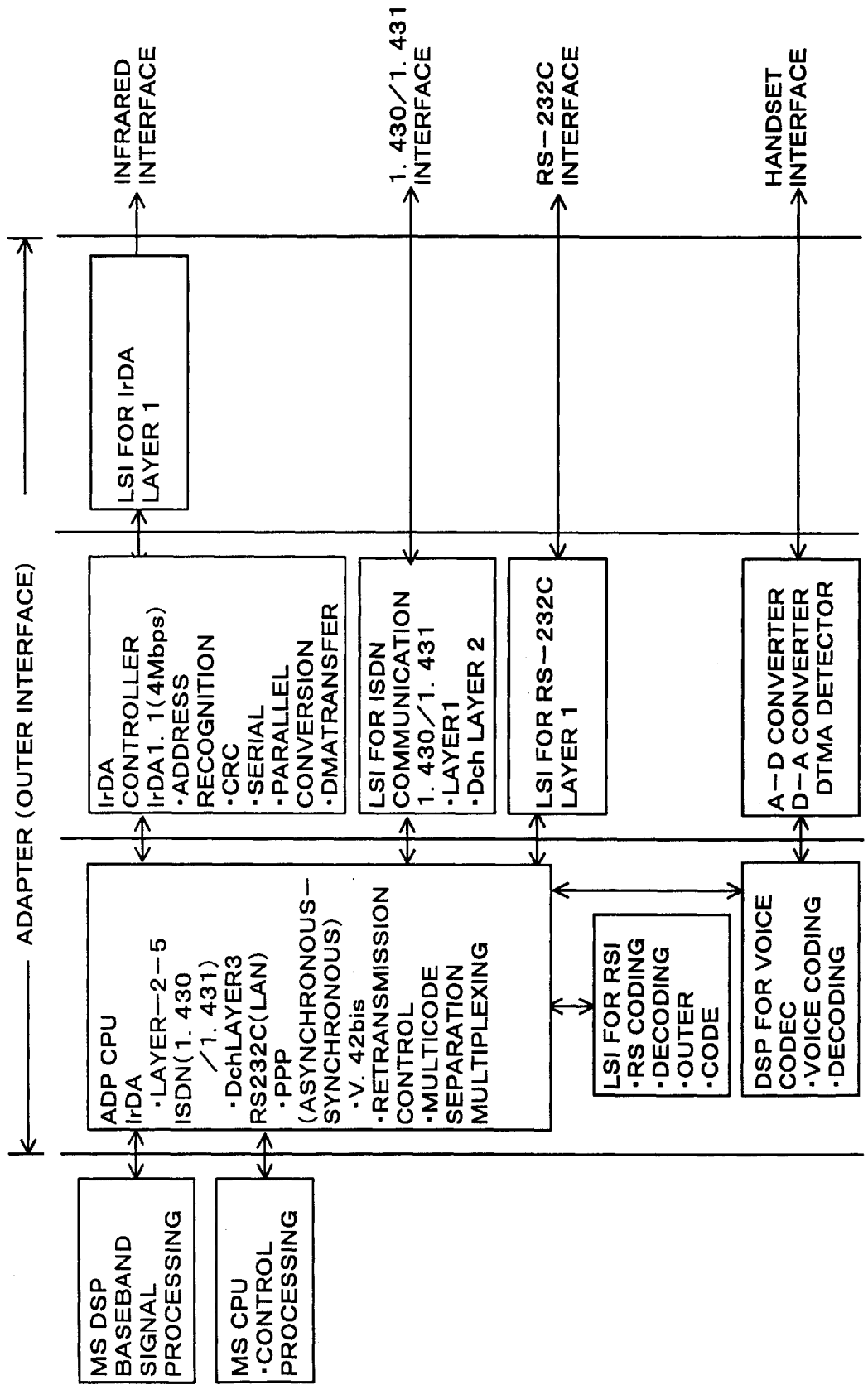
FIG. 10 is a concept diagram illustrating an example of a configuration of ADP and a control executed in each LSI corresponding to each of various interfaces.

And FIG. 10 is a concept diagram illustrating an example of a configuration of ADP 202 and a control executed in each LSI corresponding to each of various interfaces.

As illustrated in FIG. 10, the CPU for ADP at ADP 202 provides control over layers 2 through 5 for IrDA, Dch layer 3 for ISDN (I.430), PPP for RS-232C (LAN), V.42bis, retransmission control and separation and multiplexing of multicodes.

And the controller for IrDA at ADP 202 executes address path selection, serial/parallel conversion, DMA transfer, DRC coding and deciding and so on.

And LSI for RS for error check at ADP 202 controls the coding and decoding of RS, the coding and decoding of outer code, and so on.

As described above, the present invention can provide a multimedia terminal apparatus capable of multimedia communication with one mobile station apparatus, by connecting more than two different terminals to one terminal interface adapter connected to a mobile station apparatus.

Figure 11:
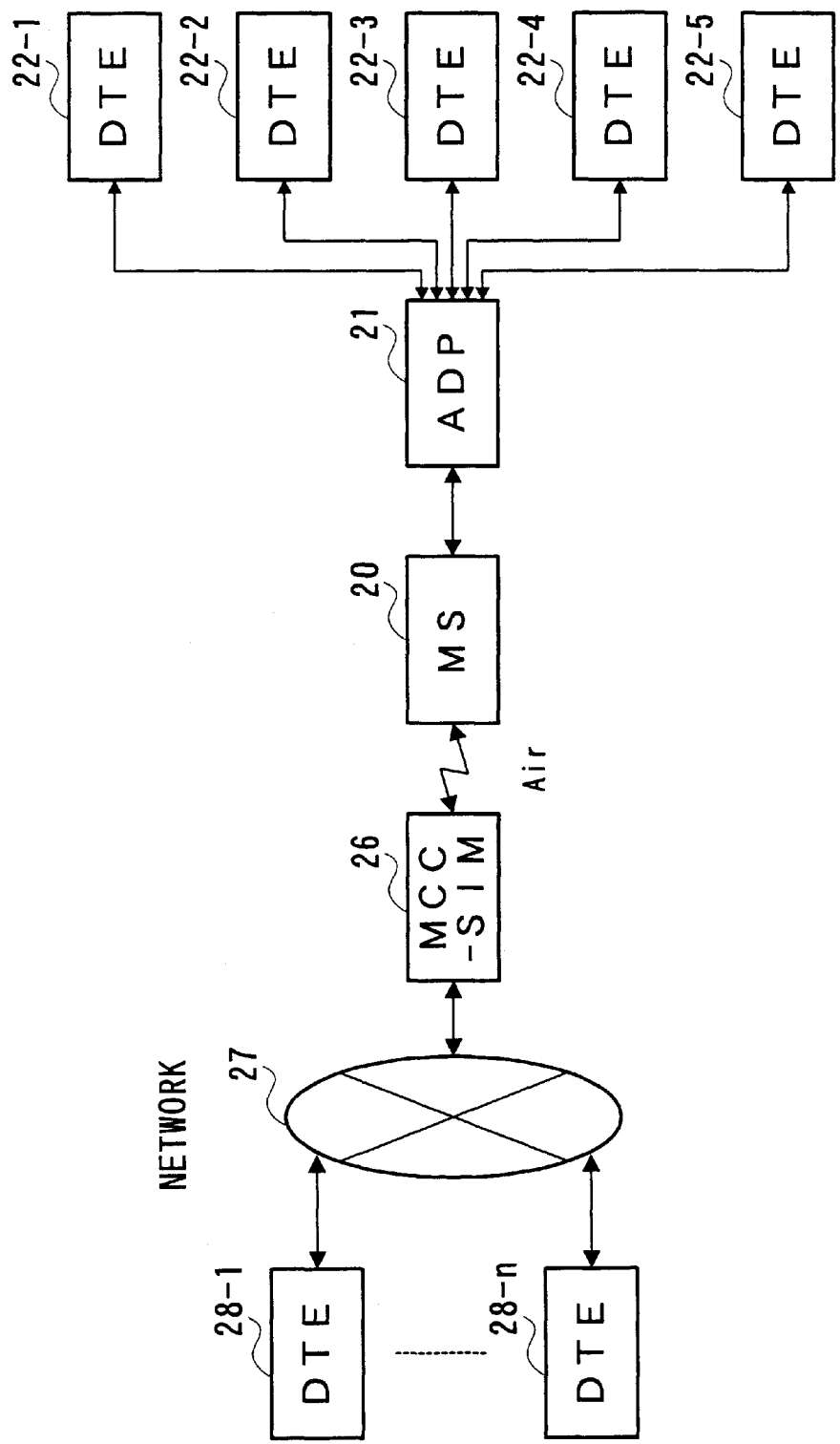
FIG. 11 shows the configuration of a multi-call communication system of an embodiment for the present invention.

FIG. 11 shows configuration of a multi-call communication system related to the embodiment of the present invention. This multi-call communication system has a configuration so that multiple terminals (DTE) 22-1 to 22-5 which are directly connected to mobile station(MS) 20 via terminal interface adapter (ADP) 21 can communicate with other terminals (DTE) 28-1 to 28-n which are connected with network 27 to which MS 20 can be connected via base station control apparatus (MCC-SIM) 26. ADP 21 is incorporated in MS 20 or externally attached thereto. MS 20 is connected to MCC-SIM 26 by air, for example, by radio. Furthermore, a plurality of DTE 22-1 to 22-5 are connected with ADP 21 via various types of terminal interfaces such as infrared ray (Ir), RS-232C, ISDN and handset, etc. Between MCC-SIM 26 and MS 20, and MS 20 and ADP 21 are designed to be linked through time division multiplex communication paths respectively. The line is set with the multiplexed positions of time division communication paths to be used for connections assigned as physical addresses.

Figure 12:
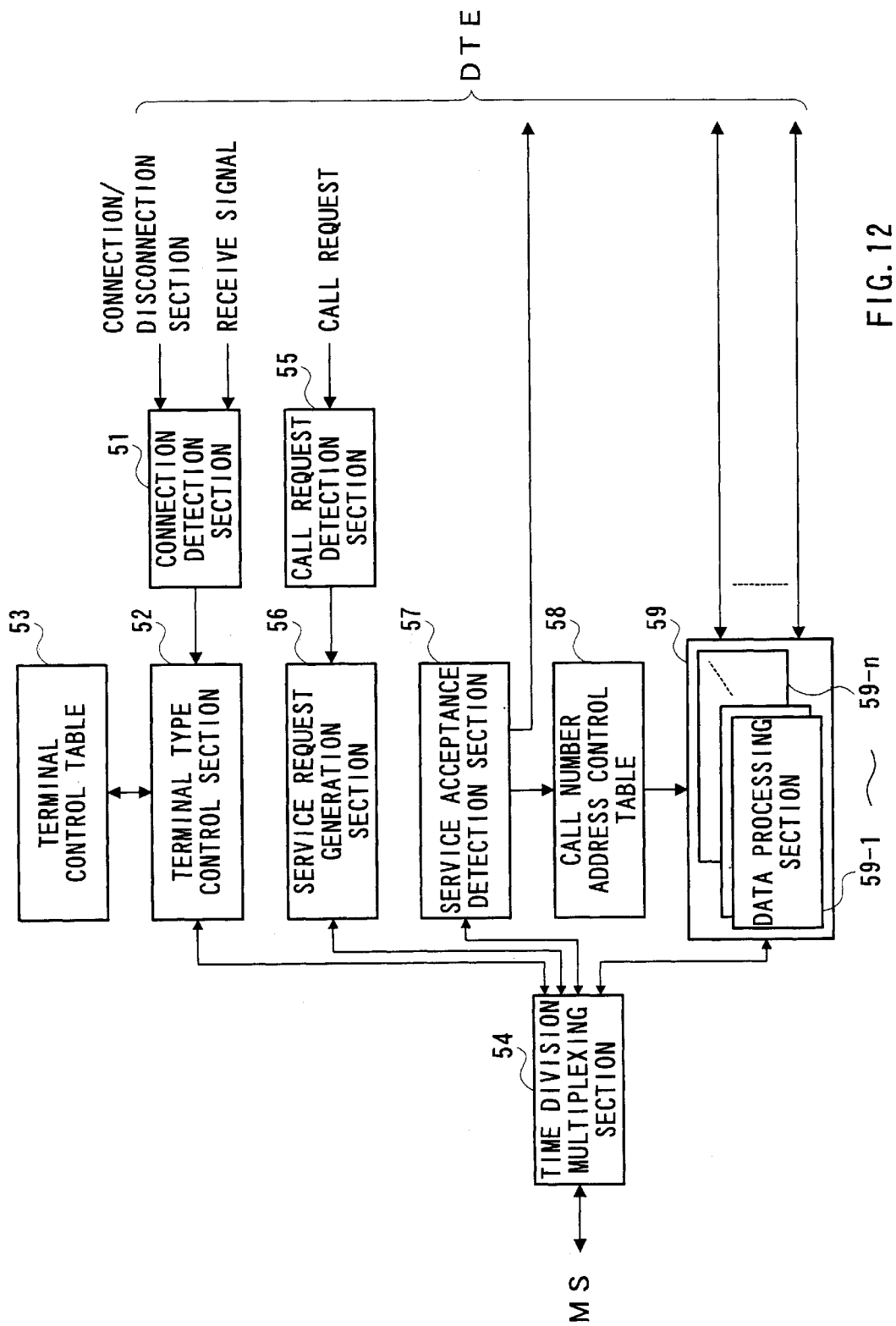
FIG. 12 is a functional section diagram of part of a terminal interface adapter.

FIG. 12 shows a functional section of part of ADP 21. A connection/disconnection signal which indicates whether DTE 22-1 to 22-5 are connected to the terminals on ADP 21 or not and a receive signal from the IrDA DTE are input to connection detection section 51. Connection detection section 51 outputs the data of the terminals connected with ADP 21 with communication enabled to terminal type control section 52. Terminal type control section 52 controls terminal types that can currently be handled based on the content of terminal control table 53. FIG. 13 shows the data structure of terminal control table 53. Terminal control table 53 registers terminal types (A to F) structurally compatible with ADP 21, physical addresses or logical addresses assigned to each terminal type and connection data that indicates whether those terminals are currently connected with communication enabled or not.

The connection data is updated according to the connection/disconnection signal and receive signal input from connection detection section 51 to terminal type control section 52. Terminal type control section 52 extracts information on the type of each DTE and number of connections from terminal control table 53 and notifies it to MS 20. Upon powering-on of ADP 21, when MS 20 sends a notification request, if a new DTE is connected with ADP 21, terminal type control section 52 notifies it. Notification from ADP 21 to MS 20 is performed with the timing assigned by time division multiplexing section 54.

This notification allows MS 20 to control the type of terminal that can respond to service requests from MCC-SIM 26 and the total number of multi-calls.

When a call request is issued from a DTE connected to ADP 21 to another DTE connected to network 27, the call request is detected by call request detection section 55.

Call request detection section 55 receives the call request issued from the DTE connected to ADP 21 and hands it over to service request generation section 56. Service request generation section 56 transmits the service request with the type of terminal specified to MS 20.

ADP 21 detects the response of MS 20 to the service request above by service acceptance detection section 57. If the response to the service request above is "service acceptance" which indicates acceptance of the service request, service acceptance detection section 57 notifies the DTE which requested the call that the call request has been accepted and at the same time adds a call number to call number address control table 58.

FIG. 14 shows the data structure of call number address control table 58. Call number address control table 58 includes addresses assigned to DTEs whose service request has been accepted and call numbers assigned to communication of DTEs whose service request has been accepted.

Now, addresses are explained below. There are two kinds of address; logical address and physical address. Physical address numbers indicate multiplexed positions on a multiplexed communication path for setting lines, while logical addresses are preset according to the type of terminal. For example, in the case of a speech terminal, its logical address is "1" and in the case of an image terminal, its logical address is "2" and so on.

When it receives a notice of service acceptance, the DTE which requested the call starts data communication with the DTE of the far-end station of communication. ADP 21 is provided with communication control section 59 which comprises data processing sections 59-1 to 59-n corresponding to various terminals. In ADP 21, the data processing section which corresponds to the DTE in communication connected to ADP 21 processes data sent from the DTE and the processed data is output from time division multiplexing section 54 to MS 20 at the timing corresponding to the address assigned to the DTE. On the other hand, the data transmitted from the MS 20 side to the DTE of on the ADP side is collected by time division multiplexing section 54 at the timing corresponding to the address assigned to the DTE and handed over to the data processing section. Then, it is output from the corresponding terminal to the DTE.

Furthermore, as described later, if MS 20 accepts a service request issued from DTE 28-1 to 28-n on the network side, the service acceptance is notified to ADP 21. In ADP 21, the service acceptance is detected by service acceptance detection section 57. When accepting a service request issued from DTE 28-1 to 28-n, service acceptance detection section 57 also notifies the DTE (22-1 to 22-5) according to the service type in the same way as above and at the same time it registers the call number and DTE address in call number address table 58. Once the service request is accepted, the data sent from a DTE on the ADP side is processed by the data processing section corresponding to the relevant DTE, time division multiplexed at the timing of the address corresponding to the call number and sent to the MS side. The data that MS 20 received from the network side is separated from the multiplexed data in time division multiplexing section 54 and handed over to the corresponding data processing section. The data is sent to the DTE connected via this data processing section.

Figure 15:
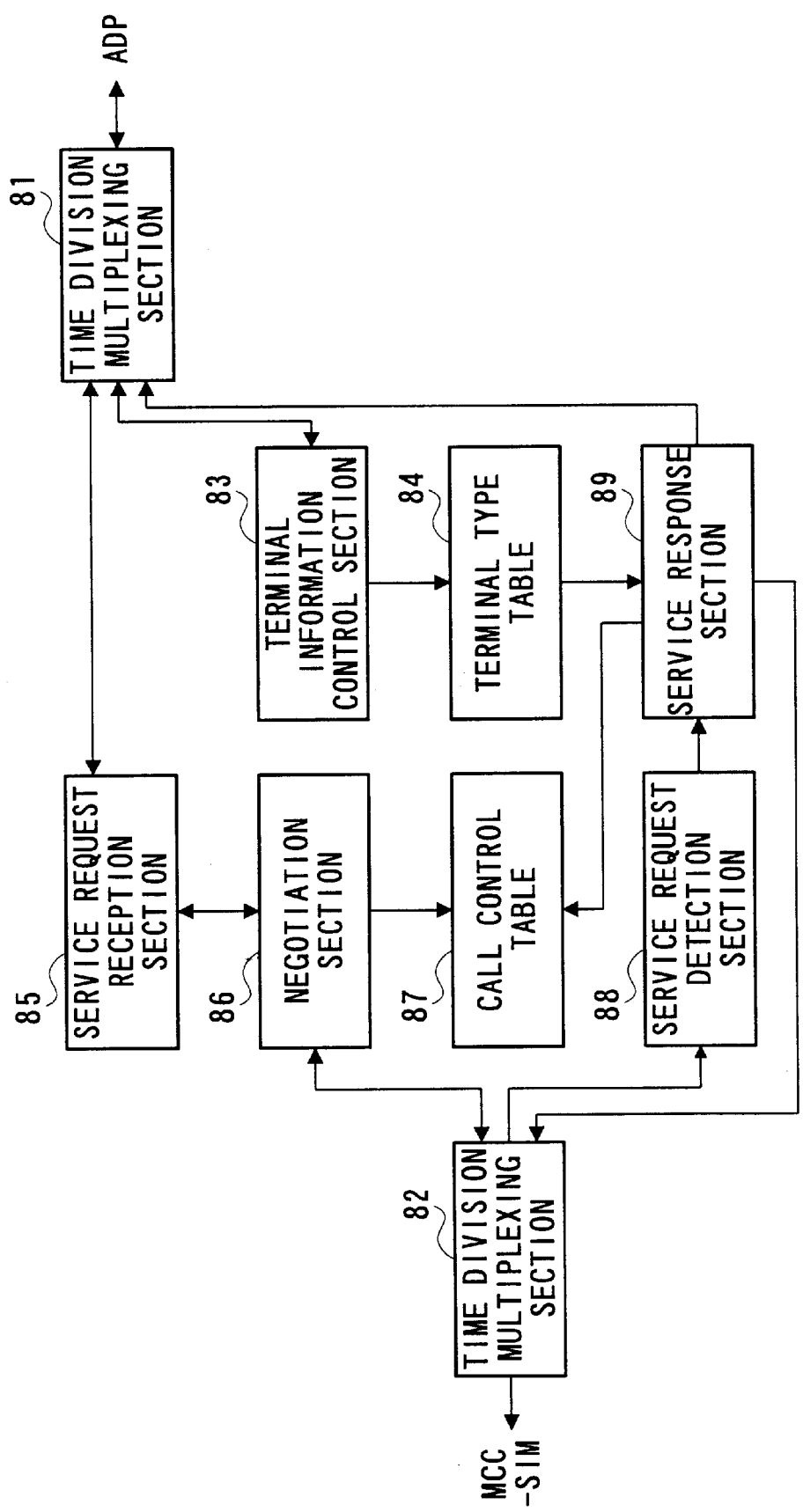
FIG. 15 is a functional section diagram of part of a mobile station.

FIG. 15 shows a functional section of MS 20. MS 20 exchanges the data time-division-multiplexed by time division multiplexing section 81 with ADP 21, while MS 20 exchanges the data time-division-multiplexed by time division multiplexing section 82 with MCC-SIM 26.

As shown above, the terminal information received from ADP 21 is stored by terminal information control section 83 in terminal type table 84. Terminal type table 84 registers terminal types with communication capability connected to ADP 21. There are two cases; when terminal information control section 83 of MS 20 requests ADP 21 for transmission of terminal types and when terminal types are automatically sent from ADP 21.

Service request reception section 85 detects a service request sent from ADP 21 and notifies it to negotiation section 86. When it receives the service request detected, negotiation section 86 negotiates with MCC-SIM 26 to see whether the service is acceptable or not and returns the negotiation result to service request reception section 85. When the negotiation is concluded, a new call number and service type are registered in call control table 87.

Service requests may also be output from DTE 28-1 and 28-2 on the opposite side of network 27 to a terminal connected to ADP 21. In this case, service request detection section 88 of MS 20 detects the service request from DTE 28-1 and 28-2 and hands it over to service response section 89. Service response section 89 judges whether the terminal type conformable with the required service type is connected to ADP 21 or not. Since the terminal type connected to ADP 21 is stored in terminal type table 84, service response section 89 can judge whether the service request is acceptable or not by checking the content of terminal type table 84. If the judgment result shows that the service is acceptable, service response section 89 registers the call number and service type in call control table 87 and at the same time it sends the call number and terminal type to ADP 21 as information incidental to the service acceptance. Service response section 89 returns the service acceptance to MCC-SIM 26 in order to also return the service request result to the DTE that requested the service.

Figure 16:
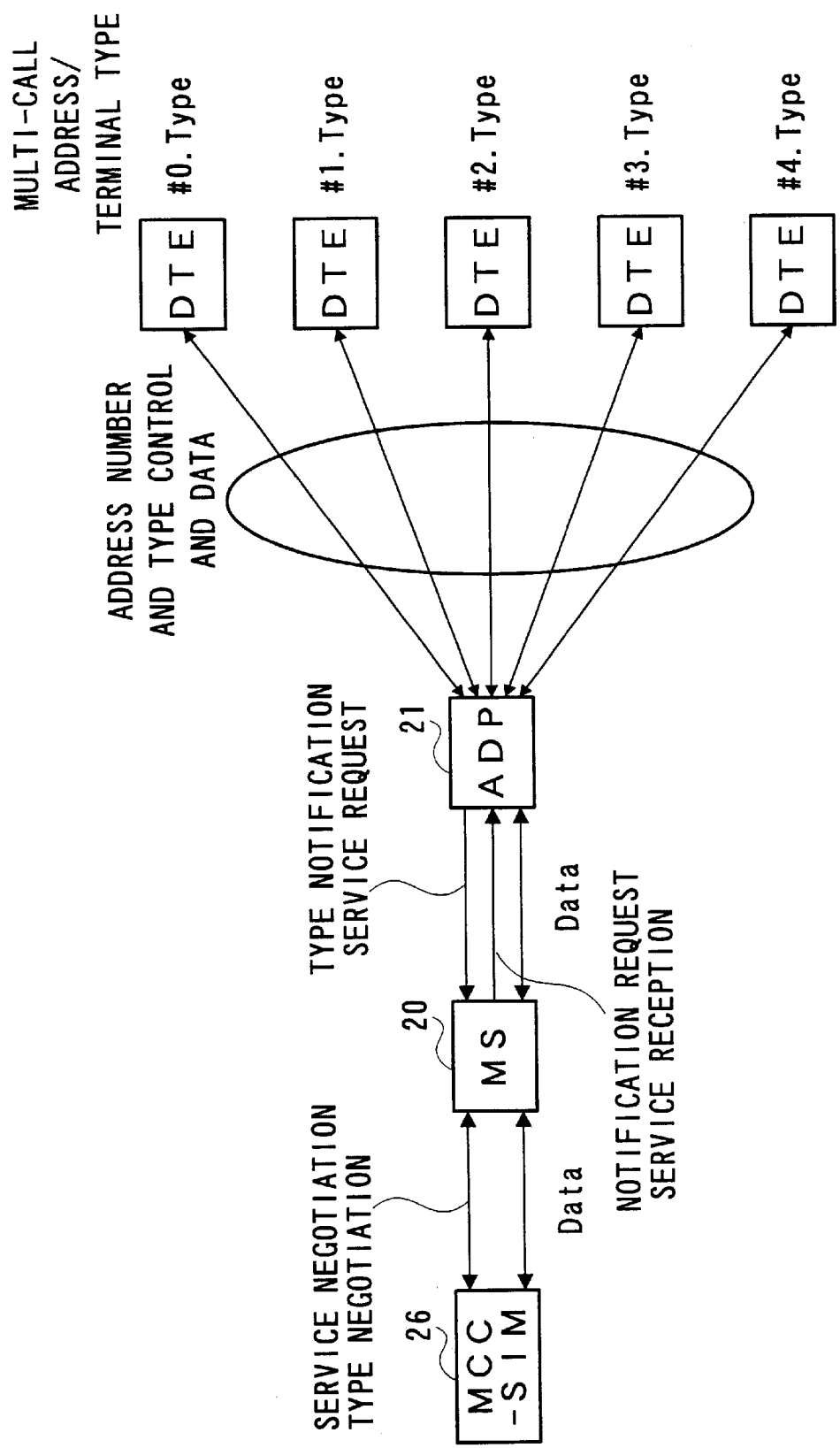
FIG. 16 shows an example of exchange of signals and data between base station control apparatus, mobile station, terminal interface adapter and various terminals.

With reference now to FIG. 16, the multi-call communication is explained more specifically below.

Multi-call communications are based on the premise that the system has been constructed so as to allow single call communications first of all. Suppose, for example, single-call communication has been started from DTE 22-2 connected via an RS232C interface to a DTE linked with network 27, for example DTE 28-1.

In this case, when data from DTE 22-2 is given to ADP 21, ADP 21 issues a service request to MS 20 according to the type of DTE 22-2 (for example, DTE of a terminal type connectable by an RS232C interface).

According to the type of DTE 22-2, MS 20 negotiates with MCC-SIM 26, checks whether the condition is met or not, and if the condition is met, MS 20 will proceed with acceptance of the service. Then, the service acceptance information is sent from MS 20 to ADP 21. At this time, MCC-SIM 26 and MS 20 control the type of service of this first call, that is, the terminal type to be used.

Or, instead of single-call communication from DTE 22 connected to ADP 21 as shown above, if a service request from a DTE linked with network 27, for example DTE 28-1, is issued from network 27 to MCC-SIM 26 and sent from MCC-SIM 26 to MS 20, MS 20 judges the type of service at that time, that is, the terminal type to be used. If none in DTE 22 connected to ADP 21 is conformable with the type of service, that is, the terminal type to be used, it acts to reject the service and if some are conformable with the type of service, that is, the terminal type to be used, MS 20 sends ADP 21 the service acceptance information. At this time, MCC-SIM 26 and MS 20 control the type of service of the first call, that is, the terminal type to be used. On the other hand, ADP 21 controls the address number of DTE 22 to which this first call is assigned.

Then, while single-call communication as shown above is in progress, suppose data is given to ADP 21 from a DTE which is not carrying out communications, for example, DTE 22-1. ADP 21 sends MS 20 a multi-call communication service request which is the second call according to the type of DTE 22-1 (for example, DTE with a terminal type connectable by an infrared interface).

According to the type (terminal type) of DTE 22-1, MS 20 negotiates with MCC-SIM 26, checks whether the condition is met or not, and if the condition is met it will proceed with acceptance of the multi-call service. Then, the service acceptance information is sent from MS 20 to ADP 21. At this time, MCC-SIM 26 and MS 20 control the type of service of this second call, that is, the terminal type to be used. On the other hand, ADP 21 controls the address number of DTE 22 to which the second call is assigned.

Then, while single-call communication as shown above is in progress, suppose a service request from a terminal (DTE) connected to network 2, for example terminal 28-n is issued from network 27 to MCC-SIM 26 and MCC-SIM 26 sends MS 20 a multi-call service request which is the second call. MS 20 judges the type of service at that time, that is, the terminal type to be used, and if none in DTE 22 connected to ADP 21 is conformable with the type of service, that is, the terminal type to be used, it will act to reject the service and if some are conformable with the type of service, that is, the terminal type to be used, MS 20 sends ADP 21 the service acceptance information. At this time, MCC-SIM 26 and MS 20 control the type of service of this second call, that is, the terminal type to be used. On the other hand, ADP 21 controls the address number of DTE 22 to which the second call is assigned.

Then, if a third, fourth, or fifth multi-call communication service request is sent from DTE 22 which is not carrying out communication or a service request from another terminal (DTE) linked with network 27 is issued from network 27 to MCC-SIM 26 and then sent from MCC-SIM 26 to MS 20, it is possible to implement a third, fourth or fifth multi-call communication service by repeating the operation described above.

ADP 21 has similar configuration of above ADP202 described in FIG. 8 And FIG. 10 shows an example of the configuration of ADP 21 and control carried out by LSIs for respective interfaces.

What is claimed is:

1. A mobile station which performs multimedia communications via a base station control apparatus connected to a network, comprising:

a time division multiplex unit that exchanges time-division-multiplexed data with the base station;

an adapter that interfaces a plurality of terminals and a single mobile station;

a terminal data controller that controls terminal data that indicates types of the plurality of terminals connected to the adapter;

a service request receiver that receives a service request from the network during communication with the base station control apparatus;

a searching unit that searches for a terminal type that can accept the service request from the base station control apparatus from the terminal data;

a service acceptance data returning unit that returns service acceptance data to the base station control apparatus when the acceptable terminal type has been detected from the terminal data;

a call number assigning and controlling unit that assigns a call number to communication corresponding to the service request for which service acceptance data is returned to the base station control apparatus, and that controls the call number and the terminal type.

2. The mobile station according to claim 1, further comprising:

a service request accepting unit that accepts a service request to be input from a terminal connected to the adapter via the adapter;

a negotiation unit that negotiates with the base station control apparatus by indicating the terminal type of a source of the accepted service request, and that returns the service acceptance data to the terminal via the adapter when the negotiating is completed;

a call number assigning and controlling unit that assigns a call number to the communication corresponding to the service request for which the service acceptance data is returned to the terminal, and that controls the call number.

3. The mobile station according to claim 1, wherein:
the adapter comprises:
- a call request detector that detects a call request from a terminal connected to the adapter;
- a service request issuing unit that issues a service request to the mobile station if the call request is detected;
- a call number and terminal address controlling unit that detects service acceptance data input from the mobile station, and that controls call numbers and terminal addresses.

4. The mobile station according to claim 1, wherein: said adapter comprises notification unit that notifies terminal data including the terminal types and number of terminals connected to said adapter to said mobile station.

5. The mobile station according to claim 4, wherein: said adapter notifies said terminal data to said mobile station when one of the power is turned on, when a notification request is issued from said mobile station and when a new terminal is connected to said adapter.

6. The mobile station according to claim 1, wherein data is at least one of transmitted and received on a time-division basis for each terminal when carrying out multimedia communications through a plurality of terminals connected to the adapter.

7. The mobile station according to claim 1, wherein said adapter can handle terminal interfaces including at least two of an infrared interface, ISDN interface, RS-232C interface and handset interface.

8. A mobile station which carries out multimedia communications through a plurality of terminals connected via an adapter, comprising:
- a time division multiplex unit that exchanges the data time-division-multiplexed with the adapter,
- a terminal data controller that collects terminal data which indicates types of terminals connected to the adapter from the adapter, and that controls the terminal data;
- a service request receiver that receives a service request from a network through communication with the base station control apparatus;
- a searching unit that searches for a terminal type which can accept a service request from the base station control apparatus from the terminal data;
- a service acceptance data returning unit that returns service acceptance data to the base station control apparatus if an acceptable terminal type is detected from the terminal data;
- a call number assigning and controlling unit that assigns a call number to communication corresponding to the service request for which service acceptance data is returned to the base station control apparatus, and that controls the call number.

9. An adapter attached to a mobile station which carries out multi-media communications via a base station control apparatus connected to a network, comprising:
- a plurality of connectors connected with a plurality of terminals;
- a call request detector that detects a call request from the plurality of terminals connected with the connectors;
- a service request issuing unit that issues a service request to the mobile station when the call request is detected;
- a call number and terminal address controller that detects service acceptance data input from the mobile station, and that controls call numbers and terminal addresses; and
- a time division multiplex unit that exchanges the data time-division-multiplexed with the mobile station in accordance with the call numbers and the terminal addresses.

10. An adapter for a multimedia communication apparatus, the adapter comprising:
- a connection information memory that stores information concerning a plurality of terminal apparatuses connected to the adapter, the plurality of terminal apparatuses comprises different types of terminal apparatuses;
- a connection information setting unit that notifies a mobile station apparatus of the information stored in the connection information memory; and
- a terminal data transmitting and receiving unit that mediates data concurrently communicated between the mobile station apparatus and each of the plurality of terminal apparatuses, in accordance with the information stored in the connection information memory.

11. The adapter for a multimedia communication apparatus according to claim 10, wherein when a new terminal apparatus is connected, the connection information setting unit notifies a setting information of said new terminal apparatus to a mobile station apparatus.

12. The adapter for a multimedia communication apparatus according to claim 10, wherein when a new terminal apparatus is connected, the connection information setting unit notifies the number of the increased terminal apparatus to a mobile station apparatus.

13. A multimedia communication apparatus comprising;
an adapter according to claim 10; and
a mobile station apparatus.

14. A multimedia radio communication system comprising;
an adapter according to claim 10;
a mobile station apparatus; and
a base station apparatus for performing a data communication to the mobile station apparatus by radio.

15. The adapter for a multimedia communication apparatus according to claim 10, wherein the connection information memory stores a table including information concerning a type of each of the plurality of terminal apparatuses and whether each of the at least one terminal apparatus is in service or not.

16. The adapter for a multimedia communication apparatus according to claim 10, wherein the connection information memory stores the number of the plurality of terminal apparatuses connected to the adapter.

17. A mobile station apparatus comprising:
- a terminal information memory that stores information related to information concerning a plurality of terminal apparatuses stored in an adapter connected to the mobile station apparatus;
- a terminal information setting unit that recognizes a type of each of the plurality of terminal apparatuses and the number of the plurality of terminal apparatuses capable of responding to a service request from a base station apparatus in accordance with the information stored in the terminal information memory to assign a multiplexing position on a time division communication path; and
- a data transmitting and receiving unit that concurrently transmits data to and receives data from each of the plurality of terminal apparatuses using cables via the adapter in accordance with the information of the assignment stored in the terminal information setting unit, the data transmitting and receiving unit transmitting data to and receiving data from the base station apparatus by a radio signal in a time division multiplexing communication.

18. The mobile station apparatus according to claim 17, wherein the terminal information memory stores a table including information concerning a type of each of the plurality of terminal apparatus and whether each of the plurality of terminal apparatuses is in service or not, the plurality of terminal apparatuses being connected to the adapter.

19. The mobile station apparatus according to claim 17, wherein the terminal information memory stores the number of the plurality of terminal apparatuses connected to the adapter.

20. The mobile station apparatus according to claim 17, wherein the terminal information memory updates the information concerning at least one of the plurality of terminal apparatuses connected to the adapter using a notification from the adapter.

21. The mobile station apparatus according to claim 17, wherein the terminal information memory updates the number of the a plurality of terminal apparatuses connected to the adapter using a notification from the adapter.

22. The mobile station apparatus according to claim 17, wherein, in accordance with the information of the assignment stored in the terminal information setting unit, the data transmitting and receiving unit multiplexes data received from a plurality of terminal apparatuses, via the adapter, to transmit data to the base station apparatus, the data transmitting and receiving unit demultiplexing multiplexed data received from the base station apparatus to transmit data to the plurality of the plurality of terminal apparatuses via the adapter.

23. A multimedia communication method comprising:

connecting an adapter connectable to a plurality of mobile side terminals, with a mobile station apparatus related to a time division multiplexing communication path;

managing information on each of the plurality of mobile side terminals connected to the adapter, the information being stored in the adapter and the mobile station apparatus, the information including a connection number indicating an order of transmission of multiplexed data, a communication condition indicating whether each of the plurality of mobile side terminals is in service or not, a service type for each of the plurality of mobile side terminals and a terminal ID of each of the mobile side terminals;

recognizing in the mobile station apparatus types of the plurality of mobile side terminals and the number of the plurality of mobile side terminals capable of responding to a service request from a base station apparatus to assign a multiplexing position on a time division communication path;

mediating, in the adapter and the mobile station apparatus, transmission of communication data between the base station apparatus and each of the plurality of mobile side terminals; and multiplexing and demultiplexing, in the mobile station apparatus, the communication data in accordance with the multiplexing position that the mobile station assigns.

24. The multimedia communication method according to claim 23, wherein when a new terminal apparatus is connected to an adapter, a type of the new terminal apparatus is decided and setting information of the terminal apparatus memorized at the adapter is renewed.

25. The multimedia communication method according to claim 24, wherein when the setting information of the terminal apparatus memorized at the adapter is renewed, the renewed setting information of the terminal apparatus is notified to a mobile station apparatus.

26. The multimedia communication method according to claim 25, wherein when the mobile station apparatus receives the renewed setting information of the terminal apparatus, setting information of the terminal apparatus connected to the adapter at the mobile station apparatus is renewed.

27. The multimedia communication method according to claim 23, wherein the data transmitted from a plurality of mobile side terminal apparatus via the adapter are multiplexed and then transmitted to the base station.

28. The multimedia communication method according to claim 27, wherein the transmitted data to the base station are multiplexed on the basis of the renewed connection number of the terminal apparatus.

* * * * *